United States Patent Office 3,293,242
Patented Dec. 20, 1966

3,293,242
α-AZIDOBENZYL PENICILLINS
Berndt Olof Harald Sjoberg and Bertil Ake Ekstrom, Sodertalje, Sweden, assignors, by mesne assignments, to Beecham Group Limited, Brentford, England, a corporation of Great Britain and Northern Ireland
No Drawing. Filed July 5, 1962, Ser. No. 207,793
Claims priority, application Great Britain, July 21, 1961, 26,488/61
2 Claims. (Cl. 260—239.1)

This invention relates to a new penicillin containing an azido group.

The compound of the present invention is of value as an antibacterial agent, as a nutritional supplement in animal feeds, as an agent for the treatment of mastitis in cattle and as a therapeutic agent in poultry and animals, including man, in the treatment especially of infectious diseases caused by Gram-positive organisms.

Additionally the compound is of value as an intermediate in the preparation of α-aminobenzylpenicillin, which is described and claimed in our Patent No. 2,985,-648.

Accordingly, the present invention provides a member selected from the group consisting of the acid α-azidobenzylpenicillin of the formula:

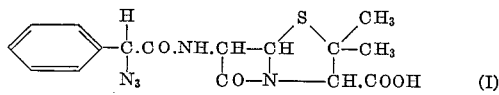

and non-toxic salts thereof.

The salts are non-toxic salts including non-toxic metallic salts such as sodium, potassium, calcium and aluminium, the ammonium salt and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The present invention further provides a process for preparing the α-azidobenzylpenicillin of the general Formula I, which process comprises reacting 6-aminopenicillanic acid or a neutral salt thereof with a compound of the general formula:

$$C_6H_5.CHN_3.COY \qquad (II)$$

wherein Y is a functional group capable of reacting with the NH$_2$— group in 6-aminopenicillanic acid to form the bridge —CO—NH—.

Preferably, the compound of the general Formula II is an acid chloride or a functional equivalent thereof as an acylating agent for a primary amino group. Such equivalents include the corresponding carboxylic acid bromides, acid anhydrides and mixed anhydrides with other carboxylic acids, including mono-esters and particularly lower aliphatic esters, of carbonic acid. Alternatively, the acylation may be carried out using a carbodiimide reagent.

The process may be carried out with 6-aminopenicillanic acid under anhydrous conditions in an inert organic solvent or the fermentation liquor obtained by growing a penicillin-producing mould in a nutrient medium with or without subsequent partial purification and containing 6-aminopenicillanic acid may be used. The solutions containing 6-aminopenicillanic acid formed by enzymatic splitting of, for example, penicillin G, may also be used in the present process.

The penicillin mentioned above contains at least one asymmetric carbon atom and will exist in D- and L-forms. It is to be understood that the present invention includes both the D- and L-forms and the DL-mixture.

The product prepared according to this invention can be isolated and purified by the known techniques used with other penicillins.

The following examples illustrate the present invention:

EXAMPLE 1

α-Azidobenzylpenicillin via the mixed anhydride

A solution of α-azidophenylacetic acid (8.9 g., 0.05 mole) and triethylamine (5.1 g., 0.05 mole) in 50 ml. of dry dimethylformamide was stirred and chilled below −5° C. At this temperature ethyl chloroformate (4.7 ml.) was added in portions so that the temperature was never above −5° C. After the mixture had been stirred for 20 minutes, dry acetone (100 ml.), chilled to −5° C., was added in one portion, immediately followed by an ice-cold solution of 6-aminopenicillanic acid (10.8 g., 0.05 mole) and triethylamine (5.1 g., 0.05 mole) in 100 ml. of water, and the stirring was continued for 1½ hours at 0° C.

The pH of the mixture was adjusted to 7.5 by adding a saturated sodium bicarbonate solution. After being washed twice with diethyl ether, the reaction solution was acidified to pH 2 with dilute hydrochloric acid and extracted with ether. The ether solution containing the free penicillin was washed twice with water and then extracted with 50 ml. of N potassium bicarbonate solution. After freeze-drying of the obtained neutral solution, the potassium salt of α-azidobenzylpenicillin was obtained as a slightly coloured powder (11.2 g., 54% yield) with a purity of 55% as determined by the hydroxylamine method (the potassium salt of penicillin G being used as a standard).

The infrared spectrum of this substance showed the presence of an azido group and a β-lactam system. The substance inhibited the growth of Staph. aureus Oxford at a concentration of 0.25 mcg./ml.

EXAMPLE 2

α-Azidobenzylpenicillin via the acid chloride 6-aminopenicillanic acid (18.5 g., 0.085 mole) and sodium bicarbonate (21 g., 0.25 mole) were dissolved in 200 ml. of water and 100 ml. of acetone. To this solution, chilled in ice, was added α-azidophenylacetyl chloride (16.6 g., 0.085 mole), diluted with 10 ml. of dry acetone. The temperature is held at 0° to 5° C. and the reaction mixture was stirred for 2½ hours.

The resulting solution was treated as described in Example 1 to give the potassium salt of α-azidobenzylpenicillin as a white powder (29.4 g., 84% yield) with a purity of 83% as determined by the hydroxylamine method (the potassium salt of penicillin G being used as a standard).

The product showed the same properties as the product obtained in Example 1; it inhibits the growth of Staph. aureus Oxford at a concentration of 0.13 mcg./ml.

The α-azidophenylacetyl chloride was prepared by treating α-azidophenylacetic acid with thionylchloride in portions at room temperature and then heating the solution under reflux for 1 hour. The α-azidophenylacetyl chloride distils at 115° C. under a pressure of 10 mm. Hg.

We claim:

1. A member selected from the group consisting of the acid α-azidobenzylpenicillin of the formula:

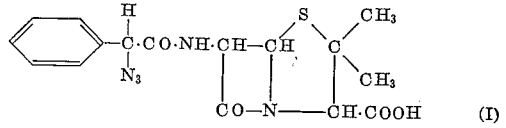

and its sodium, potassium, calcium, aluminum and ammonium salts and its non-toxic substituted ammonium salts with an amine selected from the group consisting of tri(lower)alkylamines, procaine, dibenzylamine, N-benzyl-beta-phenethylamine, 1-ephenamine, N,N'-bis-dehydroabietylethylenediamine, N,N'-dibenzylethylenediamine and dehydroabietylamine.

2. A compound having the formula:

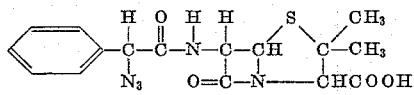

References Cited by the Examiner
UNITED STATES PATENTS 3,080,356  3/1963  Catlin et al. _____ 260—239.1
3,174,964  3/1965  Hobbs et al. _____ 260—239.1

NICHOLAS S. RIZZO, *Primary Examiner.*

DUVAL T. McCUTCHEN, WALTER A. MODANCE, HENRY R. JILES, *Examiners.*

J.W. ADAMS, *Assistant Examiner.*